US006926243B1

(12) United States Patent
Ziaylek et al.

(10) Patent No.: US 6,926,243 B1
(45) Date of Patent: Aug. 9, 2005

(54) MOUNTING BRACKET WITH AN EJECTION MEANS FOR DETACHABLE RETAINING OF A CYLINDRICAL TANK MEMBER

(76) Inventors: Michael Paul Ziaylek, 15 Cold Spring Ave., Yardley, PA (US) 19067; Theodore Ziaylek Jr., 140 Riverview Dr., Yardley, PA (US) 19067; Theodore P. Ziaylek, 152 Riverview Ave., Yardley, PA (US) 19067

( * ) Notice: Subject to any disclaimer, the term of this patent is extended or adjusted under 35 U.S.C. 154(b) by 0 days.

(21) Appl. No.: 10/635,354

(22) Filed: Aug. 6, 2003

(51) Int. Cl.[7] .............................................. F16B 45/00
(52) U.S. Cl. ..................................................... 248/307
(58) Field of Search ............................ 248/311.2, 307, 248/316.1, 313

(56) References Cited

U.S. PATENT DOCUMENTS

| | | | | |
|---|---|---|---|---|
| 1,911,781 | A | | 5/1933 | Wolfe, Jr. |
| 2,168,136 | A | * | 8/1939 | Playfair et al. ............... 169/26 |
| 2,431,698 | A | | 12/1947 | Lombard |
| 2,903,225 | A | | 9/1959 | Weinstein |
| 3,193,232 | A | | 7/1965 | Hatcher |
| 3,224,720 | A | | 12/1965 | Hain |
| 3,317,171 | A | * | 5/1967 | Kramer ................. 248/229.15 |
| 3,547,391 | A | | 12/1970 | Johnson |
| 3,603,550 | A | | 9/1971 | Byrd |
| D222,527 | S | | 11/1971 | Ziaylek, Jr. |
| 3,780,972 | A | | 12/1973 | Brodersen |
| 3,823,907 | A | | 7/1974 | Ziaylek, Jr. |
| D237,357 | S | | 10/1975 | Ziaylek, Jr. |
| D245,929 | S | | 9/1977 | Montambo |
| 4,213,592 | A | * | 7/1980 | Lingenfelser ............... 248/313 |
| D267,227 | S | | 12/1982 | Ziaylek, Jr. |
| 4,379,541 | A | | 4/1983 | Harkness |
| 4,391,377 | A | | 7/1983 | Ziaylek, Jr. |
| 4,586,687 | A | | 5/1986 | Ziaylek, Jr. |
| D298,704 | S | | 11/1988 | Ziaylek, Jr. |
| 4,848,714 | A | | 7/1989 | Ziaylek, Jr. et al. |
| D303,738 | S | | 10/1989 | Ziaylek, Jr. |
| 4,971,275 | A | | 11/1990 | Roberts |
| D314,325 | S | | 2/1991 | Ziaylek, Jr. et al. |
| 4,997,157 | A | | 3/1991 | Sweeny |
| D319,778 | S | | 9/1991 | Ziaylek, Jr. |
| 5,071,100 | A | | 12/1991 | Sweeny |
| 5,190,260 | A | | 3/1993 | Daubenspeck |
| D342,666 | S | | 12/1993 | DePack |

(Continued)

*Primary Examiner*—Leslie A. Braun
*Assistant Examiner*—Kofi A. Schulterbrandt
(74) *Attorney, Agent, or Firm*—Sperry, Zoda & Kane

(57) ABSTRACT

A mounting bracket for holding a cylindrical tank member such as an air tank or other emergency tank particularly used by emergency personnel wherein the tank is easily detachable from the bracket and easily attachable thereto. The mechanism includes a backing plate member mounted to the wall with an upper and lower clamping member extending outwardly therefrom for holding the tank in a tank storage zone spatially disposed from the backing plate member. A restraining device such as a strap is included for holding the tank in the tank storage zone and an ejection device is positioned between the backing plate member and the tank storage zone for ejecting the tank if the restraining mechanism is not properly secured. The restraining means can be operated with one hand while the user's other hand holds the tank in the storage zone.

23 Claims, 4 Drawing Sheets

U.S. PATENT DOCUMENTS

| | | | | | |
|---|---|---|---|---|---|
| 5,299,855 | A | * | 4/1994 | Zubeck | 297/485 |
| D347,735 | S | | 6/1994 | Ziaylek, Jr. et al. | |
| 5,318,266 | A | | 6/1994 | Liu | |
| 5,362,022 | A | | 11/1994 | McLoughlin et al. | |
| 5,533,701 | A | | 7/1996 | Trank | |
| 5,681,080 | A | | 10/1997 | Pond et al. | |
| D394,381 | S | * | 5/1998 | Ziaylek et al. | D8/354 |
| 5,833,195 | A | | 11/1998 | Haynes | |
| 5,890,544 | A | | 4/1999 | Love et al. | |
| D419,317 | S | | 1/2000 | Pond et al. | |
| 6,059,245 | A | | 5/2000 | Hermansen et al. | |
| 6,067,913 | A | | 5/2000 | Bennett | |
| 6,186,166 | B1 | | 2/2001 | Myers | |
| 6,220,557 | B1 | | 4/2001 | Ziaylek et al. | |
| 6,264,154 | B1 | | 7/2001 | Hiscox et al. | |
| 6,536,612 | B2 | | 3/2003 | Flores | |
| 6,543,736 | B2 | | 4/2003 | Field | |
| 6,565,053 | B1 | | 5/2003 | Larky | |

* cited by examiner

MOUNTING BRACKET WITH AN EJECTION MEANS FOR DETACHABLE RETAINING OF A CYLINDRICAL TANK MEMBER

BACKGROUND OF THE INVENTION

1. Field of the Invention

The present invention deals with the field of devices for holding cylindrical tanks such as self-contained breathing apparatus and other air tanks vertically with respect to walls and seats to facilitate storage thereof and allow emergency personnel to quickly don such breathing assistance gear. These devices preferably hold the cylindrical tank vertically in a tank holding zone to facilitate rapid and convenient deployment thereof for users. Such devices are used often in the seat back of seats in fire trucks. They are also used in firehouses and other areas frequented by emergency personnel such as firefighters and the like.

2. Description of the Prior Art

There are numerous prior art devices which have been patented for the purpose of holding cylindrical tanks vertically with respect to a wall surface or a seat back such as U.S. Pat. No. 1,911,781 patented May 30, 1933 to 0. P. Wolfe, Jr. on a "Support And Holder For Brooms, Mops, And The Like"; and U.S. Pat. No. 2,431,698 patented Dec. 2, 1947 to H. Lombard on a "Removable Mounting Installation"; and U.S. Pat. No. 2,903,225 patented Sep. 8, 1959 to B. I. Weinstein and assigned to Lockheed Aircraft Corporation on a "Holder For Drinking Cups And The Like"; and U.S. Pat. No. 3,193,232 patented Jul. 6, 1965 to C. M. Hatcher on a "Radio Bracket or Holder"; and U.S. Pat. No. 3,224,720 patented Dec. 21, 1965 to C. L. Hain and assigned to The Fire Guard Corporation on a "Combined Handle Lock And Bracket For Fire Extinguishers"; and U.S. Pat. No. 3,547,391 patented Dec. 15, 1970 to D. E. Johnson on a "Quick Release Support For Rescue Breathing Apparatus"; and U.S. Pat. No. 3,603,550 patented Sep. 7, 1971 to C. D. Byrd and assigned to Lacy J. Miller Machine Company, Inc. on a "Quick Release Support"; and U.S. Pat. No. 3,780,972 patented Dec. 25, 1973 to J. C. Brodersen on a "Mounting Apparatus for Gas Containers"; and U.S. Pat. No. 3,823,907 patented Jul. 16, 1974 to T. Ziaylek, Jr. on a "Positive Locking Device"; and U.S. Pat. No. 4,213,592 patented Jul. 22, 1980 to D. J. Lingenfelser and assigned to Caterpillar Tractor Co. on a "Bracket Assembly For Mounting Fire Extinguishers Thereon"; and U.S. Pat. No. 4,379,541 patented Apr. 12, 1983 to D. M. Harkness on a "Holder For A Container"; and U.S. Pat. No. 4,391,377 patented Jul. 5, 1983 to T. Ziaylek, Jr. on a "Knock-Down Assembly For Supporting Oxygen Tanks"; and U.S. Pat. No. 4,586,687 patented May 6, 1986 to T. Ziaylek, Jr. on an "Air Tank Support Of The Quick Release Type"; and U.S. Pat. No. 4,848,714 patented Jul. 18, 1989 to T. Ziaylek, Jr. et al on a "Mounting Plate With Rollers"; and U.S. Pat. No. 4,971,275 patented Nov. 20, 1990 to J. C. Roberts on a "Lightweight, Flexible Holder For Scuba Tanks And The Like"; and U.S. Pat. No. 4,997,157 patented Mar. 5, 1991 to H. D. Sweeny and assigned to Swenco Limited on a "Multi-Purpose Canister Wall Bracket"; and U.S. Pat. No. 5,071,100 patented to H. D. Sweeny on Dec. 10, 1991 and assigned to Swenco Limited on a "Multi-Purpose Canister Wall Bracket"; and U.S. Pat. No. 5,190,260 patented Mar. 2, 1993 to R. P. Daubenspeck on a "Water Heater Tank Support"; and U.S. Pat. No. 5,318,266 patented Jun. 7, 1994 to H. Liu on a "Drink Holder"; and U.S. Pat. No. 5,362,022 patented Nov. 8, 1994 to J. E. McLoughlin et al on an "Air Tank Bracket With Strap-Lifting Arms"; and U.S. Pat. No. 5,533,701 patented Jul. 9, 1996 to R. D. Trank on a "Foldable Stabilizing Bracket For Compressed Air Tanks"; and U.S. Pat. No. 5,681,080 patented Oct. 28, 1997 to G. M. Pond et al and assigned to Seats, Inc. on a "Vehicle Seat For Person Wearing Self-Contained Breathing Apparatus"; and U.S. Pat. No. 5,833,195 patented Nov. 10, 1998 to D. H. Haynes and assigned to The United States of America as represented by the Secretary of the Army on a "Gas Retaining Device"; and U.S. Pat. No. 5,890,544 patented Apr. 6, 1999 to R. Love et al on a "Self-Contained Remote Automated Fire Suppression"; and U.S. Pat. No. 6,059,245 patented May 9, 2000 to F. Hermansen et al on a "Locking Water Bottle Cage For Bicycles"; and U.S. Pat. No. 6,067,913 patented May 30, 2000 to R. C. Bennett on a "Stackable Pallet System For Transporting Gas Containers"; and U.S. Pat. No. 6,186,166 patented to J. M. Myers on Feb. 13, 2001 and assigned to Myers Quick Drop, Inc. on a "Fire Hose Release Device"; and U.S. Pat. No. 6,220,557 patented Apr. 24, 2001 to M. P. Ziaylek et al and assigned to Michael P. Ziaylek, Theodore Ziaylek, Jr. and Theodore P. Ziaylek on a "Mounting Bracket Means For Detachably Supporting A Generally Cylindrically-Shaped Member Upon A Wall Structure"; and U.S. Pat. No. 6,264,154 patented Jul. 24, 2001 to I. Hiscoz et al and assigned to Rover Group Limited on a "Container Holder For A Motor Vehicle"; and U.S. Pat. No. 6,536,612 patented Mar. 25, 2003 to S. Fl. Flores and assigned to Sagarte, S. A. on a "Support For Casks"; and U.S. Pat. No. 6,543,736 patented Apr. 8, 2003 to B. J. Field and assigned to Pacific Safety Products Inc. on a "Quick Release Supporting Apparatus For A Canister"; and U.S. Pat. No. 6,565,053 patented May 20, 2003 to J. Larky on a "Cane Holder"; and U.S. Design Pat. Des. No. 222,527 patented Nov. 2, 1971 to T. Ziaylek, Jr. on a "Bracket For Use With Lifesaving Equipment"; and U.S. Design Pat. Des. No. 237,357 patented Oct. 28, 1975 to T. Ziaylek, Jr. and assigned to Ziamatic Corporation on a "Tank Support Bracket For Lifesaving Equipment"; and U.S. Design Pat. Des. No. 245,929 patented Sep. 27, 1977 to R. J. Montambo and assigned to The Ansul Company on a "Fire Extinguisher Bracket"; and U.S. Design Pat. Des. No. 267,227 patented Dec. 14, 1982 to T. Ziaylek, Jr. and assigned to Ziamatic Corporation on a "Support Bracket For A Gas Cylinder"; and U.S. Design Pat. Des. No. 298,704 patented Nov. 29, 1988 to T. Ziaylek, Jr. on a "Seat For Use Primarily In Emergency Vehicles"; and U.S. Design Pat. Des. No. 303,738 patented Oct. 3, 1989 to T. Ziaylek, Jr. on a "Rotatable Cylinder Holder"; and U.S. Design Pat. Des. No. 314,325 patented Feb. 5, 1991 to T. Ziaylek, Jr. et al on a "Clamping Set Of Bracket Arms For Supporting Tubular Objects"; and U.S. Design Pat. Des. No. 319,778 patented Sep. 10, 1991 to T. Ziaylek, Jr. on a "Vertical Support Brace Bracket Panel For Holding Tubular Objects"; and U.S. Design Pat. Des. No. 342,666 patented Dec. 28, 1993 to R. G. DePack on a "Scuba Cylinder Attachment Block"; and U.S. Design Pat. Des. No. 347,735 patented Jun. 14, 1994 to T. Ziaylek, Jr. et al on a "Quick Release Support Tank Bracket"; and U.S. Design Pat. Des. No. 394,381 patented May 19, 1998 to T. Ziaylek, Jr. et al on a "Tank Bracket"; and U.S. Design Pat. Des. No. 419,317 patented Jan. 25, 2000 to G. M. Pond et al and assigned to Seats, Inc. on a "Seat".

SUMMARY OF THE INVENTION

The present invention provides a mounting bracket having an ejection mechanism for the purpose of detachably retaining a cylindrical tank member with respect to a wall surface. The mounting bracket itself includes a backing plate member securable to the wall surface which defines an ejection zone immediately thereadjacent.

An upper clamping member extends outwardly away from the backing plate member in such a manner as to define a storage zone adjacent the ejection zone for selectively retaining and holding of a cylindrical tank member. The ejection zone itself is preferably positioned between the tank storage zone and the backing plate member.

The configuration of the upper clamping member preferably includes an upper clamp base secured to the backing plate member for allowing securement of the upper clamping member fixedly with respect to the backing plate member. A first upper clamp arm is included secured to and extending outwardly from the upper clamp base to engage the cylindrical tank member in order to facilitate retaining thereof selectively in the tank storage zone in abutment with respect to the first upper clamp arm. The first upper clamp arm includes a first upper clamp arm protective coating preferably applied thereover by dipping which minimizes damaging of a cylindrical tank member retained within the tank storage zone. The upper clamping member also preferably includes a second upper clamp arm secured to the upper clamp base and extending outwardly therefrom at a position spatially disposed opposite from the location of the first upper clamp arm. The first upper clamp arm and the second upper clamp arm preferably define the tank storage zone therebetween. The second upper clamp arm is adapted to abut the cylindrical tank member oppositely from the first upper clamp arm responsive to the cylindrical tank member being located in the tank storage zone to facilitate selective retaining thereof with respect to the backing plate member. The second upper clamp arm preferably also includes a second upper clamp arm protective coating applied thereover by dipping which minimizes damaging of a cylindrical tank member retained within the tank storage zone.

The upper clamping member preferably also includes a first upper extension arm which is fixedly secured to the upper clamp base and extends outwardly therefrom approximately perpendicularly with respect to the backing plate member. This first upper extension arm is preferably fixedly secured to the first upper clamp arm which extends outwardly therefrom to define the tank storage zone thereadjacent. A second upper extension arm is also included fixedly secured to the upper clamp base and extending outwardly therefrom oriented approximately perpendicularly with respect to the backing plate member. This second upper extension arm is oriented approximately parallel to and spatially disposed from the first upper extension arm. The second upper extension arm is fixedly secured to the second upper clamp arm which extends outwardly therefrom to facilitate defining of the tank storage zone. The first upper extension arm and the second upper extension arm are preferably of a sufficient size in order to locate the tank storage zone spatially between the first upper clamp arm and the second upper clamp arm at a position sufficiently distant from the backing plate member to provide enough space for mounting of the ejection mechanism on the backing plate member between the backing plate member and the tank storage zone. This area is defined preferably as the ejection zone. The second upper extension arm is preferably spatially disposed from the second upper extension arm at a distance greater than the size of the cylindrical tank member for preventing movement of the tank therebetween and thus maintaining of the tank within the tank storage zone.

A lower clamping member may also be included which extends outwardly away from the backing plate member at a position below the upper clamping member which further defines a tank storage zone thereadjacent. This tank storage zone is adjacent to the ejection zone for selectively retaining and holding of a cylindrical tank as desired. The ejection zone is preferably positioned between the tank storage zone and the backing plate member. This lower clamp member preferably includes a lower clamp base secured to the backing plate member to facilitate securement of the lower clamping member fixedly with respect to the backing plate member.

The lower clamping member further includes a first lower clamp arm secured to the lower clamp base and extending outwardly therefrom in such a manner as to engage the cylindrical tank member for facilitating retaining thereof selectively in the tank storage zone in abutment with respect to the first lower clamp arm. This first lower clamp arm preferably includes a first lower clamp arm protective coating applied thereover by dipping which minimizes damaging of a cylindrical tank member retained within the tank storage zone. The lower clamping member may further include a second lower clamp arm secured to and extending outwardly from the lower clamp base at a position spatially disposed oppositely from the first lower clamp arm. This first lower clamp arm and the second lower clamp arm preferably further define the tank storage zone therebetween. The second lower clamp arm is adapted to abut the cylindrical tank member oppositely from the first lower clamp arm responsive to the cylindrical tank member being positioned in the tank storage zone for the purpose of facilitating selective retaining thereof with respect to the backing plate member. The second lower clamp arm includes a second lower clamp arm protective coating preferably which is applied thereover by dipping which minimizes damaging of a cylindrical tank member positioned in the tank storage zone.

The lower clamping member further includes a first lower extension arm fixedly secured to the lower clamp and extending outwardly therefrom approximately perpendicularly with respect to the backing plate member. This first lower extension arm is preferably fixedly secured to the first lower clamp arm which extends outwardly therefrom to define the tank storage zone immediately thereadjacent preferably. The lower clamping member further includes a second lower extension arm fixedly secured to the lower clamp base. It extends outwardly therefrom approximately perpendicularly with respect to the backing plate member preferably. The second lower extension arm preferably is oriented approximately parallel to and spatially disposed from the first lower extension arm. The second lower extension arm preferably is fixedly secured to the second lower clamp arm which extends outwardly therefrom for the purpose of facilitating defining of the tank storage zone thereadjacent. The first lower extension arm and the second lower extension arm are preferably large enough to position the tank storage zone at a sufficient distance from the backing plate member to facilitate mounting of the ejection mechanism on the backing plate member between the backing plate member and the tank storage zone. This area is defined as the ejection zone preferably. The second lower extension arm is preferably spatially disposed from the first lower extension arm at a distance less than the size of the cylindrical tank member to prevent positioning of the tank therebetween.

An ejection mechanism is included secured to the backing plate member within the ejection zone. It is adapted in the steady state position to exert a force continuously against the cylindrical tank member when positioned within the tank storage zone for the purpose of urging ejecting movement thereof outwardly unless it is restrained properly therewithin. The ejection mechanism is capable of being forced to move to a compressed position completely located within the ejection zone whenever the cylindrical tank member is firmly secured within the tank storage zone. This ejection mechanism is preferably secured to the backing plate member at a position below the upper clamping member and above the lower clamping member to facilitate operative ejection of a cylindrical tank member unless the restraining mechanism is properly engaged.

The ejection mechanism preferably includes a flat spring which is flexibly resilient and is attached at one end to the backing plate member. A bumper means is secured on the flat spring for the purpose of facilitating the exerting of force against a cylindrical tank member positioned within the tank storage zone while minimizing damaging thereof.

A restraining means is preferably included comprising a retraining strap which is flexible and is attached with respect to the backing plate member. It is preferably adapted to extend around the cylindrical tank member for selective retaining thereof within the tank storage zone and for retaining of the ejection mechanism in the compressed position in abutment with respect to the cylindrical tank member responsive to retaining of the cylindrical tank member in the tank storage zone.

Structurally the restraining mechanism preferably includes a first clasping means attached with respect to the backing plate and extends outwardly therefrom. The restraining means further includes a second clasping means attached with respect to the restraining strap means and detachably engageable with respect to the first clasping means to detachably secure the restraining strap in position extending around a cylindrical tank member when positioned in the tank storage zone with the ejection means held in the compressed position. The first clasp is preferably fixedly secured rigidly with respect to the backing plate member to facilitate selective detachment and detachable securement of the second clasp with respect to the first clasp by the one hand of a user while simultaneously making the user's other hand free to hold the cylindrical tank member within the tank storage zone. The restraining strap further includes an upper strap section attached with respect to the backing plate and extending outwardly therefrom. This upper strap section extends around the cylindrical tank member positioned within the tank storage zone and is attached with respect to the first clasp for detachable securement around the tank. The upper strap section is attached to the backing plate member at a position immediately below the upper clamping member. Similarly a lower strap section is included in the restraining means which is attached with respect to the backing plate member at a location beneath the upper strap section and extending outwardly therefrom. The lower strap section extends around a cylindrical tank member positioned within the tank storage zone and is attached with respect to the first clasp for detachable securement therearound. The lower strap section is preferably attached to the backing plate member at a position immediately below the lower clamping member.

The present invention preferably also includes a lower shelf member secured to the backing plate member and extending outwardly therefrom to provide lower support for a cylindrical tank member positioned in the tank storage zone. This lower shelf member preferably extends outwardly from the lower portion of the backing plate member at an angle with respect thereto that is greater than 90 degrees to facilitate passive ejection of the cylindrical tank member from the tank storage zone unless firmly retained therewithin by the restraining mechanism.

It is an object of the present invention to provide a mounting bracket with an ejection means for detachably retaining of a cylindrical tank member with respect to a wall surface which maintains the cylindrical tank in vertical orientation.

It is an object of the present invention to provide a mounting bracket with an ejection means for detachably retaining of a cylindrical tank member with respect to a wall surface which automatically ejects the tank from the bracket if the tank is not properly restrained therein.

It is an object of the present invention to provide a mounting bracket with an ejection means for detachably retaining of a cylindrical tank member with respect to a wall surface which requires affixing of a positive restraining means for holding the tank in the tank holding zone within the bracket in order for the tank to remain in place adjacent the bracket.

It is an object of the present invention to provide a mounting bracket with an ejection means for detachably retaining of a cylindrical tank member with respect to a wall surface which includes a lower shelf extending outwardly from the lower portion of the bracket for supporting a tank positioned within the tank storage zone wherein the bracket is inclined downwardly at greater than 90 degrees with respect to the backing plate to facilitate passive ejection of a cylindrical tank member therefrom.

It is an object of the present invention to provide a mounting bracket with an ejection means for detachably retaining of a cylindrical tank member with respect to a wall surface which allows a user with one hand to hold the tank in the tank storage zone while the other hand can latch a fully operable one-handed clasping mechanism.

It is an object of the present invention to provide a mounting bracket with an ejection means for detachably retaining of a cylindrical tank member with respect to a wall surface which includes a backing plate mounted with respect to a wall surface with an ejection mechanism positioned within an ejection zone immediately thereadjacent and a tank storage zone positioned immediately thereadjacent at a position outwardly from the backing plate.

It is an object of the present invention to provide a mounting bracket with an ejection means for detachably retaining of a cylindrical tank member with respect to a wall surface wherein an ejection zone is defined between the tank storage zone and the backing plate to receive an ejection mechanism therein to facilitate ejection of the cylindrical tank member from the tank storage zone if the restraining mechanism is not properly and positively engaged.

It is an object of the present invention to provide a mounting bracket with an ejection means for detachably retaining of a cylindrical tank member with respect to a wall surface which minimizes a number of moving parts.

It is an object of the present invention to provide a mounting bracket with an ejection means for detachably retaining of a cylindrical tank member with respect to a wall surface which is easily maintained.

It is an object of the present invention to provide a mounting bracket with an ejection means for detachably retaining of a cylindrical tank member with respect to a wall surface which is of limited initial capital cost.

It is an object of the present invention to provide a mounting bracket with an ejection means for detachably retaining of a cylindrical tank member with respect to a wall surface which can be used to allow emergency personnel to quickly put on a self-contained breathing apparatus from its storage location mounted upon a vertically extending wall.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
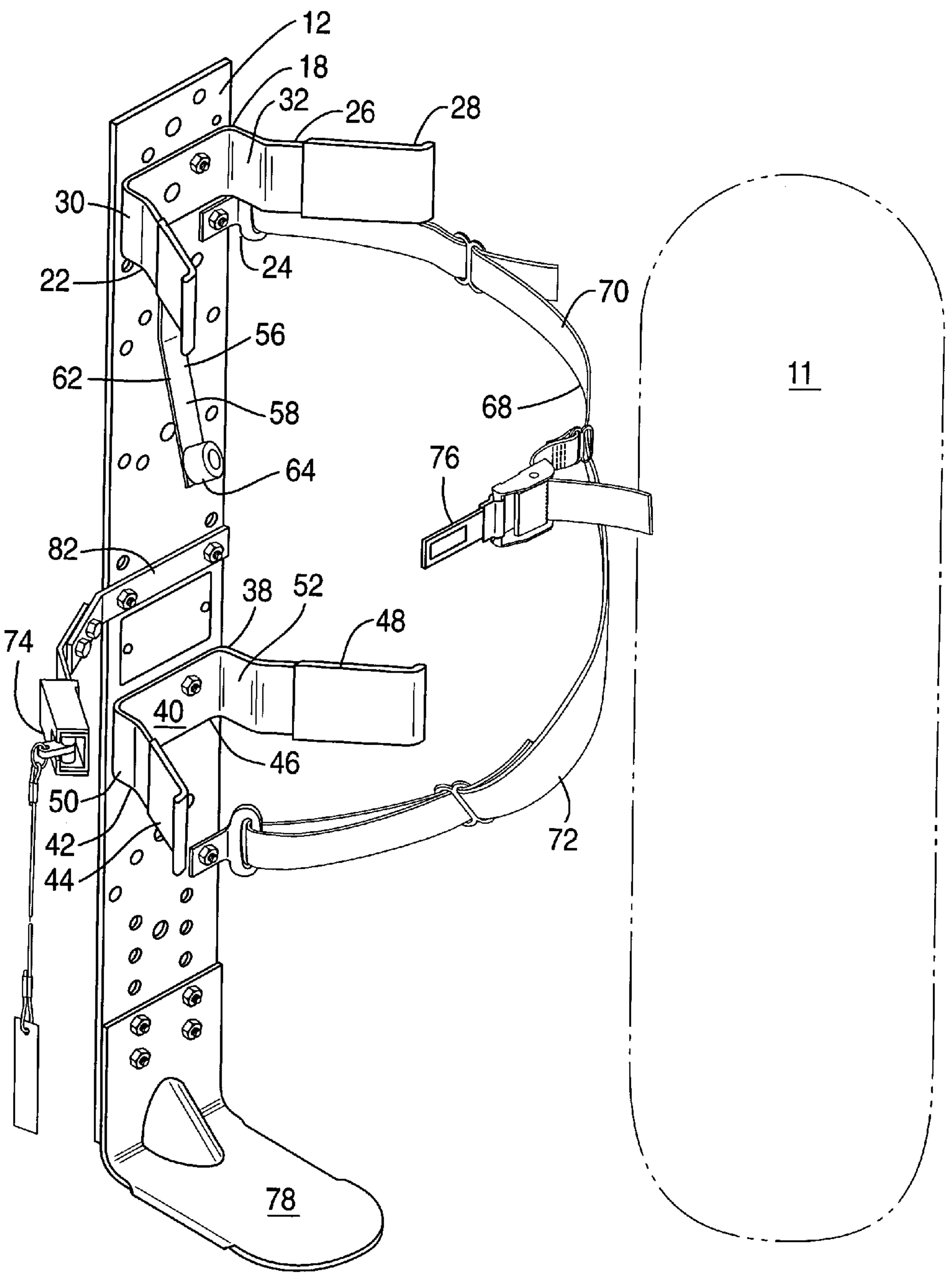
FIG. 1 is a perspective illustration of an embodiment of the mounting bracket with ejection means of the present invention and of a cylindrical tank member for use therewith.

The present invention provides a unique configuration for a mounting bracket adapted to detachably retain a cylindrical tank member 11 with respect to a wall surface 10 which is preferably oriented extending vertically. The mounting bracket configuration includes a backing plate member 12 which can be secured as needed with respect to a wall 10 and which includes an upper clamping member 18 and a lower clamping member 38 defined thereon along with a lower shelf 78 which cooperate to facilitate securement of a cylindrical tank member 11 thereto. Preferably the backing member 12 is generally flat and extends vertically along the wall 10 to facilitate securement thereto. Upper clamping member 18 is secured to the backing plate 12 near the upper portion thereof. Lower clamping member 38 is secured to the backing plate member 12 along the lower portion thereof and below the lower clamping member 38 a lower shelf 78 is positioned for supporting from beneath a cylindrical tank 11 which is being held with respect to the mounting bracket.

The configuration of the upper clamping member 18 and the lower clamping member 38 is extremely important in regard to analyzing the novelty of the present invention. The upper clamping member 18 preferably includes an upper clamp base 20 which is secured fixedly directly to the backing plate member 12. Upper clamping member 18 preferably includes a first upper extension arm means 30 fixedly secured with respect to the upper clamp base 20 and extending outwardly therefrom approximately perpendicular with respect thereto. Similarly upper clamp base 20 will include also a second upper extension arm 32 extending outwardly therefrom approximately perpendicular with respect thereto. The first upper extension arm 30 and the second upper extension arm 32 will extend outwardly from the upper clamp base 20 spatially distant from one another and approximately parallel to each other. The distance between the first upper extension arm 30 and the second upper extension arm 32 is shown by distance reference 34. This distance 34 should be less than the size of the smallest cylindrical tank 11 with which the bracket of the present invention will be used in order to prevent such a tank from ever being positioned between the first upper extension arm 30 and the second upper extension arm 32.

A first upper clamp arm 22 will be secured to and extend outwardly from the first upper extension arm 30. First upper clamp arm 22 will extend outwardly therefrom and be angularly oriented with respect thereto. Similarly a second upper clamp arm 26 will be fixedly secured with respect to the second upper extension arm 32 and will extend outwardly therefrom with an angular relationship thereto such that the second upper clamp arm 26 extends away from the first upper clamp arm 22 and the defines therewith a generally concave shape for facilitating the defining of a tank storage zone 16 therebetween. With this configuration whenever a cylindrical tank 11 is positioned within the tank storage zone 16 it can be brought into abutment with respect to the first upper clamp arm 22 and the second upper clamp arm 26 for firm securement in abutment thereagainst to prevent damage to the surface of the cylindrical tank 11. A first upper clamp arm protective coating 24 is preferably positioned extending over and across the first upper clamp arm 22. Similarly protection of the cylindrical tank 11 is enhanced by the inclusion of a second upper clamp arm protective coating 28 extending over the second upper clamp arm 26.

Figure 4:
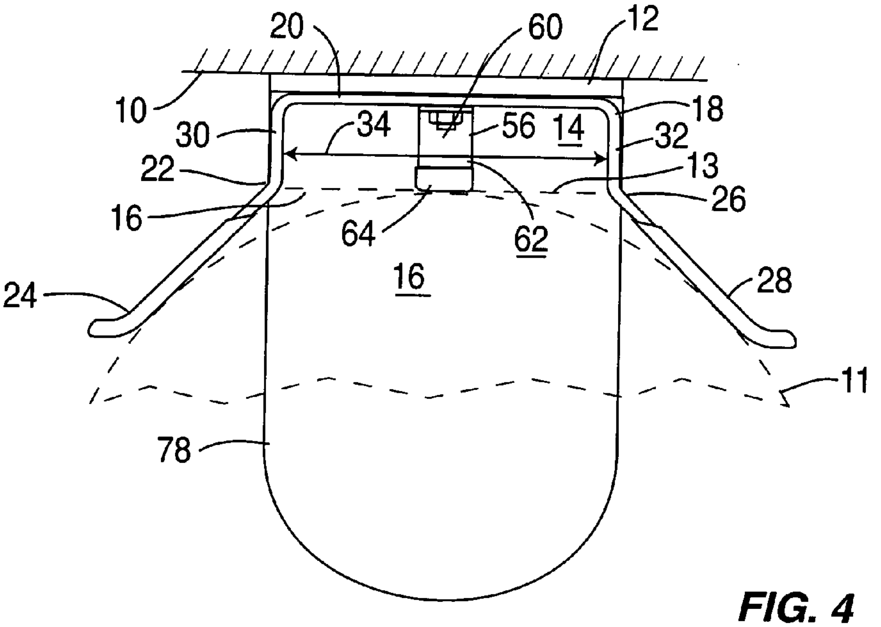
FIG. 4 is a top plan view of the embodiment shown in FIG. 1 illustrating an expanded view of the backing plate and ejection zone area showing the ejector in the compressed position.
Figure 5:
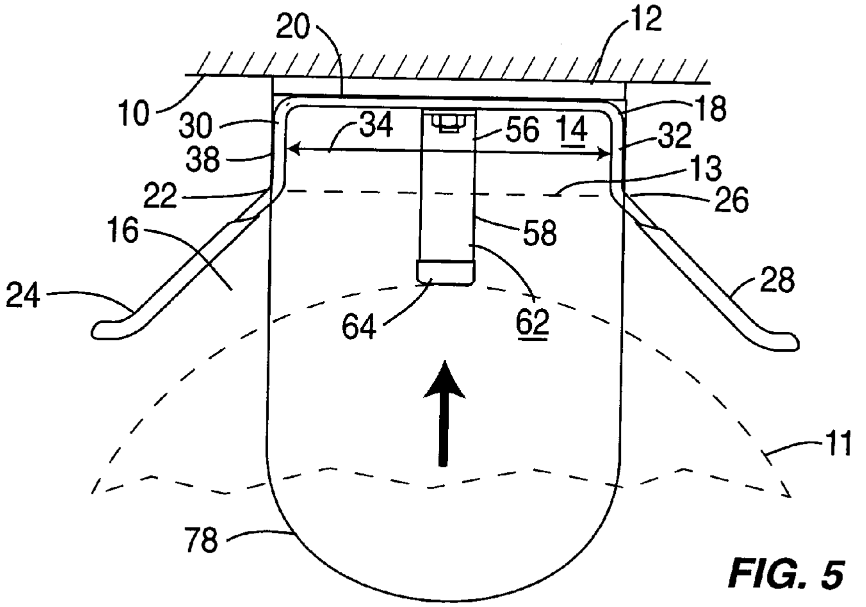
FIG. 5 is a top plan view of the embodiment shown in FIG. 1 showing the ejector mechanism in the extended position.

It should be appreciated that the distance between the first upper clamp arm 22 and the second upper clamp arm 26 is sufficiently wide to define the tank storage zone 16 and, as such, can receive a cylindrical tank member 11 positioned therebetween. However, the first upper extension arm 30 and the second upper extension arm 32 are only separated by a distance 34 which is less than the size of the smallest cylindrical tank 11 with which the present invention will be utilized. As such, the tank storage zone 16 is defined only between the first upper clamp arm 22 and the second upper clamp arm 26. As such, a cylindrical tank 11 will always be maintained spaced apart from the backing plate member 12. This area between the backing plate member 12 and the tank storage zone 16 defined within the first upper clamp arm 22 and the second upper clamp arm 26 will be defined as the ejection zone means 14. In FIGS. 4 and 5 the boundary between the ejection zone 14 and the tank storage zone 16 is specifically defined by the dividing line 13. The ejection zone 14 is defined specifically for the purpose of mounting of an operative ejection means 56 to the backing plate member 12 immediately in or adjacent to the ejection zone 14 for the purpose of facilitating removal of the cylindrical tank 11 from the tank storage zone 16 when the tank is not firmly secured therewithin. The ejector mechanism can take various configuration however in the present invention it includes a flat spring 62 with a bumper means 64 mounted therein. Flat spring 62 includes one end thereof secured directly to the backing plate 12 and the other end flexibly extending outwardly therefrom and including the bumper 64 mounted thereon. This flat spring means 62 which comprises the ejection means 56 is movable between an extended position 58 which is the steady state position of the ejection means 56 as shown best in FIG. 5 and a compressed position 60 shown best in FIG. 4. In the steady state position the flat spring 62 and hence the ejection mechanism 56 will be oriented such that it extends into the tank storage zone 16. However, when the cylindrical tank 11 is firmly secured within the tank storage zone 16 the wall of tank 11 will exert pressure against the flat spring 62 through the bumper 64 and will move it to the compressed position 60 wherein the entire ejection mechanism 56 is maintained within the ejection zone 14 in this compressed position 60. Any time the tank 11 is removed from the tank storage zone 16 the flat spring 62 will return to the steady state extended position 58 such that it extends out of the ejection zone 14 across the dividing line 13 and into the tank storage zone 16. This mechanism has the purpose of urging the cylindrical tank 11 to disengage from the mounting bracket and in particular the upper clamping member 18 and the lower clamping member 38 thereof whenever the tank 11 is not firmly held within the tank storage zone 16. As such, when a user wishes to position a cylindrical tank 11 secured to the mounting bracket initially the user will use one hand to hold the cylindrical tank 11 in abutment with respect to the upper clamping member 18 and the lower clamping member 38 which will urge the cylindrical tank 11 to push against the ejection means 56 and move it to the compressed position 16 contained entirely within the ejection zone 14. The user will then use the other hand to secure the restraining means 66. Once the restraining means 66 is firmly engaged and secured the cylindrical tank 11 will be held in the tank storage zone 16 and the ejection means 56 will be firmly held in the compressed position 60 within the ejection zone 14. If for any reason the restraining means 66 is improperly attached such as it does not hold the tank securely the ejection mechanism 56 will push the cylindrical tank 11 out of engagement with respect to the upper clamping member 18 and the lower clamping member 38 such that it is released by the mounting bracket. However, as long as the cylindrical tank 11 is retained by the restraining means 66 in the tank storage zone 16 firmly the ejection means 56 will be maintained in the collapsed position and will be held within the ejection zone 14.

The mounting bracket of the present invention will preferably also include a lower clamping member 38. Lower clamping member 38 specifically includes a lower clamp base 50 which is directly secured fixedly with respect to the backing plate 12. Lower clamp base 40 preferably includes a first lower extension arm 50 extending outwardly therefrom and a second lower extension arm 52 extending outwardly therefrom. Preferably extension arms 50 and 52 extend approximately parallel with respect to one another and are spatially distant from one another as shown by distance line 54 in FIG. 2. This distance will preferably be less than the diameter of the smallest cylindrical tank 11 with which the present invention will be usable. As such, this construction prevents any possibility of the cylindrical tank 11 of being capable of being positioned between the first lower extension arm 50 and the second lower extension arm 52. A first lower clamp arm 42 will preferably be fixedly secured to and possibly integral with respect to the first lower extension arm 50 to extend outwardly and laterally therefrom. Similarly a second lower clamp arm 46 will be fixedly secured to and preferably integral with respect to the second lower extension arm 52 to extend laterally outwardly therefrom. Preferably the first lower clamp arm 42 and the second lower clamp arm 46 will extend laterally away from one another to define a generally concave surface which defines therebetween the lower portion of the tank storage zone 16. Thus the tank storage zone 16 will be defined between the first lower clamp arm 42 and the second lower clamp arm 46 for holding of cylindrical tank 11 therein. However, movement of the cylindrical tank 11 further inwardly toward the backing plate member 12 of the lower clamping member 38 to a position between the first lower extension arm 50 and the second lower extension arm 52 will be prevented by limiting the distance 54 between arms 50 and 52 to less than the size of the smallest cylindrical tank 11 with which the present invention can be usable. When the cylindrical tank 11 is positioned in the tank storage zone 16 it is preferable that it will abut the first lower clamp arm 42 and the second lower clamp arm 46. Prevention of damage to the external surface of the cylindrical tank 11 is enhanced by the inclusion of a first lower clamp arm protective coating 44 extending over the first lower clamp arm 42 in the area thereof which will be brought into abutment with the cylindrical tank 11 when positioned in the tank storage zone 16. Similarly a second lower clamp arm protective coating 48 will preferably be positioned extending over the surface of the second lower clamp arm 46 in such a manner that a cylindrical tank 11 positioned within the tank storage zone 16 will be brought into abutment therewith and the external surface of the tank will be similarly protected.

The area between the first lower extension arm 50 and the second lower extension arm 52 which cannot be entered by the cylindrical tank 11 because it is larger than the distance 54 therebetween is established for the purpose of defining the lower portion of the ejection zone 14 therein. This ejection zone 14 provides a spacing required for the operation of the ejection mechanism 56 therewithin. This ejection mechanism 56 can take any configuration but in the present embodiment includes a flat spring 62 with a bumper means 64 attached thereto. One end of the flat spring 62 is secured to the backing plate member 12 within the lower portion of the ejection zone 14 and the other portion of the flat spring member 62 will exert an outward bias on the bumper 64 which be exerted against a cylindrical tank 12 whenever it is positioned within the tank storage zone 16. When cylindrical tank 11 is firmly held within the tank storage zone 16 the flat spring 62 and the bumper 64 of the ejection mechanism 56 will be held within the ejection zone 14. On the other hand when a cylindrical tank 11 is not positioned within the tank storage zone 16 the flat spring 62 and bumper 64 of the ejection mechanism 56 will extend through the ejection zone 14 into the tank storage zone 16 and this is the steady state position of this ejector mechanism. This steady state extended position 58 is shown in FIG. 5 and the compressed position 60 is shown best in FIG. 4 with the outer surface of the cylindrical tank exerting pressure on the bumper 64 for holding the entire ejection mechanism 56 within the ejection zone 14.

The restraining means used with the present invention can assume various configurations. As shown in the figures of the present invention the preferred configuration contemplated at the present time is a restraining strap 68. This restraining strap 68 will include an upper strap section 70 and a lower strap section 72. These two members join together at a second clasping means 76. A first clasping means 74 is secured to a rigid fixture 82 which extends outwardly therefrom. Rigid fixture 82 is preferably fixedly secured to the backing plate member 12 in such a manner as to be rigidly maintained thereby. The first clasping means 74 will be secured to the rigid structure 82. First clasp 74 and second clasp 76 will be detachably securable with respect to one another to firmly secure the restraining strap 68 about a cylindrical tank 11 positioned within the tank storage zone 16 for firmly holding it therewithin.

Figure 2:
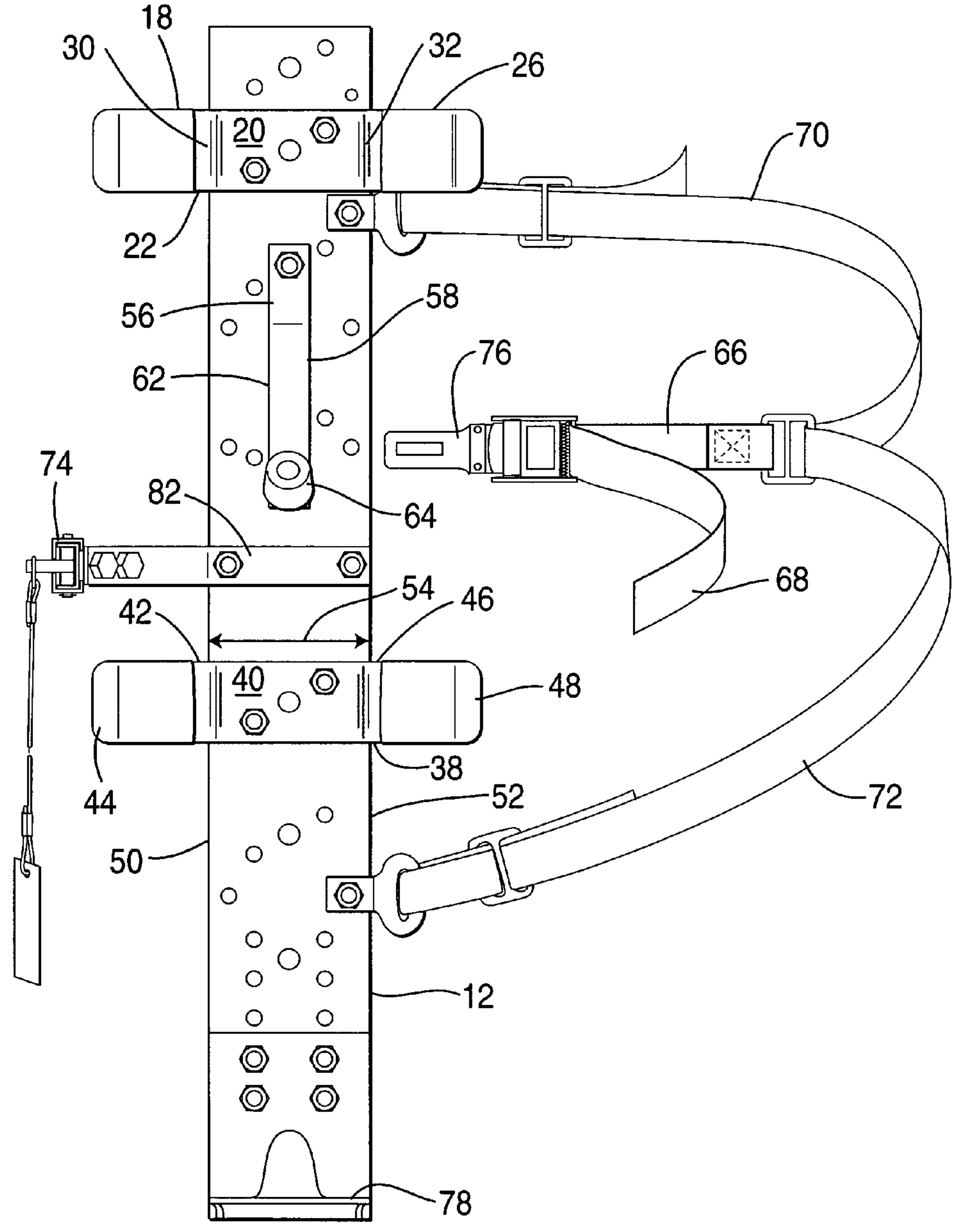
FIG. 2 is a front plan view of the embodiment shown in FIG. 1.
Figure 3:
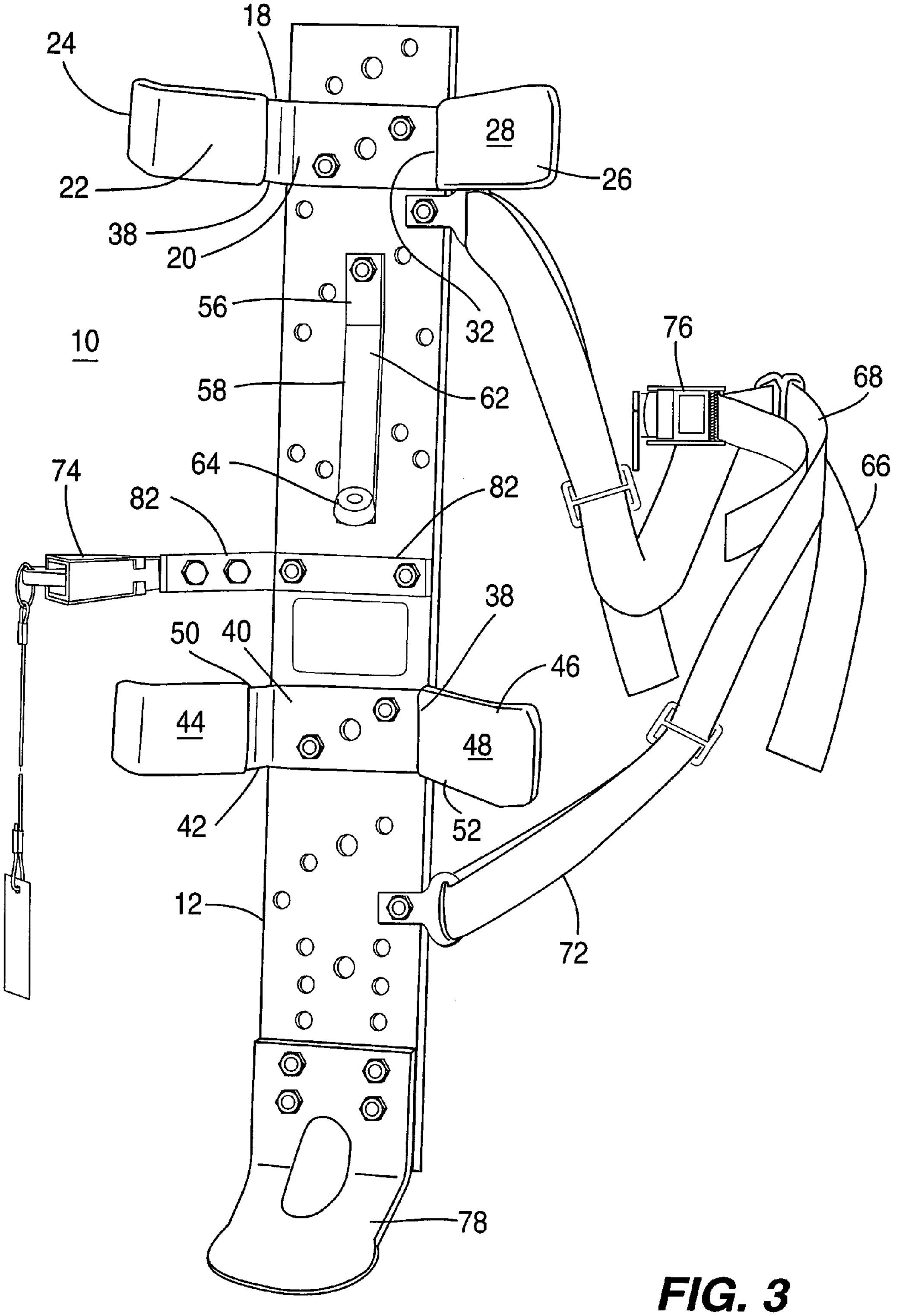
FIG. 3 is a three-quarter right perspective view of the embodiment shown in FIG. 1.

In the preferred configuration of the present invention the fixture 82 will be rigid and will hold the first clasp 74 at the outermost position thereon as shown best in FIGS. 1, 2 and 3. The second clasp 76 will be secured with respect to the upper strap section 70 and the lower strap section 72 and preferably will be connected with respect to a flexible restraining strap 68. The flexibility of the restraining strap 68 and the rigid structure of the fixture 82 will allow the user to engage the first clasp with respect to the second clasp 76 with one hand. This is important because the user who is attempting to mount the cylindrical tank 11 to the mounting bracket of the present invention needs to use the other hand to hold the cylindrical tank 11 in the tank storage zone 16. This is necessary because the ejection mechanism 56 will cause the cylindrical tank 11 to be ejected from the tank storage zone 16 unless force is exerted from some source to hold it in position. Initially this source will be one hand of a user. However, after the user uses his other hand to engage the first and second clasping means 74 and 76 with respect to one another, the cylindrical tank 11 will now be detachably but firmly held in the tank storage zone 16 and a successful mounting has been achieved. And, in this manner a single person can easily mount a cylindrical tank 11 to the mounting bracket of the present invention. This is made possible because one hand is required to be used to hold the cylindrical tank 11 in position in the tank storage zone 16 while the other hand can achieve engagement between the first and second clasps 74 and 76 which is a one-handed operation because of the forming of the fixture 82 as a rigid member fixedly secured to the backing plate member 12 and extending outwardly therefrom.

Figure 6:
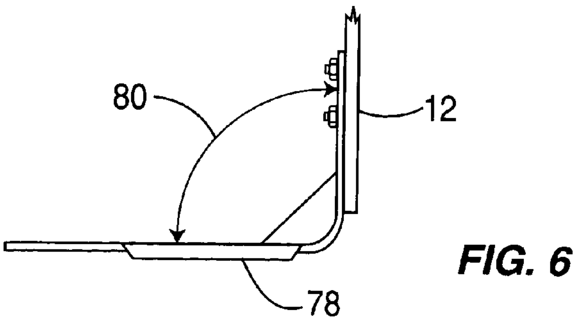
FIG. 6 is a side plan view of the embodiment shown in FIG. 1 illustrating an expanded view of the lower shelf and angular relationship thereof with respect to the backing plate member.

A further enhancement of the present invention is included by the specific orientation of the lower shelf 78 with respect to the backing plate member 12. To further facilitate ejection of a cylindrical tank 11 from the tank storage zone 16 responsive to a lack of firm securement of the tank with respect to the mounting bracket of the present invention, the lower shelf means 78 is preferably angled downwardly outwardly away from the backing plate member 12. As shown best in FIG. 6 this orientation achieves an angle between the backing plate 12 and the lower shelf means 78 which is greater than 90 degrees. Angle 80 when chosen greater than 90 degrees will help the ejection mechanism 56 in achieving its overall purpose of ejecting a cylindrical tank 11 from its position adjacent to the mounting bracket of the present invention responsive to an incomplete securement thereof with respect to the mounting bracket. By having the lower shelf 78 angled slightly away and downwardly from the backing plate member 12 instead of being oriented approximately perpendicularly with respect thereto enhances significantly the operation of ejection mechanism 56 by more easily allowing the cylindrical tank 11 to fall away therefrom when improperly secured in place.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A mounting bracket with an ejection means for detachable retaining of a cylindrical tank member with respect to a wall surface comprising:

A. a backing plate member securable to a wall surface;

B. an upper clamping member extending outwardly away from said backing plate member and defining a tank storage zone means for selectively receiving and holding of a cylindrical tank member therewithin, said upper clamping member including:

(1) an upper clamp base means secured to said backing plate member to facilitate securement of said upper clamping member fixedly with respect to said backing plate member;

(2) a first upper clamp arm means secured to and extending outwardly from said upper clamp base means to engage the cylindrical tank member for facilitating retaining thereof selectively in said tank storage zone means with the cylindrical tank member in abutment with respect to said first upper clamp arm means;

(3) a second upper clamp arm means secured to and extending outwardly from said upper clamp base means at a position spatially disposed oppositely from said first upper clamp arm means, said first upper clamp arm means and said second upper clamp arm means defining said tank storage zone means therebetween which is particularly adapted to receive a cylindrically shaped tank member therewithin, said second upper clamp arm means adapted to abut the cylindrical tank member oppositely from said first upper clamp arm means responsive to the cylindrical tank member being positioned in said tank storage zone means to facilitate selective retaining of the cylindrically shaped tank member with respect to said backing plate member;

C. a lower clamping member extending outwardly away from said backing plate member at a position below said upper clamping member and further defining the tank storage zone means for selectively receiving and holding of a cylindrical tank member therewithin, said lower clamping member including:

(1) an lower clamp base means secured to said backing plate member to facilitate securement of said lower clamping member fixedly with respect to said backing plate member;

(2) a first lower clamp arm means secured to and extending outwardly from said lower clamp base means to engage the cylindrical tank member for facilitating retaining thereof selectively in said tank storage zone means with the cylindrical tank member in abutment with respect to said first lower clamp arm means;

(3) a second lower clamp arm means secured to and extending outwardly from said lower clamp base means at a position spatially disposed oppositely from said first lower clamp arm means, said first lower clamp arm means and said second lower clamp arm means further defining said tank storage zone means therebetween which is particularly adapted to receive a cylindrically shaped tank member therewithin, said second lower clamp arm means adapted to abut the cylindrical tank member oppositely from said first lower clamp arm means responsive to the cylindrical tank member being positioned in said tank storage zone means to facilitate selective retaining of the cylindrically shaped tank member with respect to said backing plate member;

D. an ejection means secured to said backing plate member and adapted in steady state to exert a force continuously against the cylindrical shape of a cylindrical tank member positioned within said tank storage zone means for urging ejecting movement thereof outwardly therefrom, said ejection means being capable of being forced to move to a compressed position to allow the cylindrical tank member to be retained in said tank storage zone means;

E. a restraining means attached with respect to said backing plate member and adapted to engage the cylindrical tank member for selective retaining thereof within said tank storage zone means and for retaining of said ejection means in the compressed position in abutment with respect to the cylindrical tank member responsive to retaining of the cylindrical tank member in said tank storage zone means; and F. a lower shelf member secured to said backing plate member and extending outwardly therefrom to provide lower support for a cylindrical tank member positioned in said tank storage zone means, said lower shelf member extending outwardly from said backing plate member at an angle with respect thereto of greater than ninety degrees to facilitate passive ejection of a cylindrical tank member from said tank storage zone means unless retained therewithin by said restraining means.

2. A mounting bracket with an ejection means for detachable retaining of a cylindrical tank member with respect to a wall surface as defined in claim 1 wherein said restraining means includes a restraining strap means secured to said backing plate member and adapted to extend around a cylindrical tank member positioned within said tank storage zone means for retaining same therewithin and for forcibly holding said ejection means in the compressed position.

3. A mounting bracket with an ejection means for detachable retaining of a cylindrical tank member with respect to a wall surface as defined in claim 2 wherein said restraining strap means is flexible and wherein said restraining means further includes:

A. a first clasping means attached with respect to said backing plate member and extending outwardly therefrom;

B. a second clasping means attached with respect to said restraining strap means and detachably engageable with respect to said first clasping means to detachably secure said restraining strap means in position extending around a cylindrical tank member positioned in said tank storage zone means with said ejection means held in the compressed position.

4. A mounting bracket with an ejection means for detachable retaining of a cylindrical tank member with respect to a wall surface as defined in claim 3 wherein said first clasping means is fixedly secured rigidly with respect to said backing plate member to facilitate selective detachment and detachable securement of said second clasping means with respect to said first clasping means by a user while simultaneously allowing holding of the cylindrical tank member within said tank storage zone means by the user.

5. A mounting bracket with an ejection means for detachable retaining of a cylindrical tank member with respect to a wall surface as defined in claim 1 further comprising an ejection zone means defined between said backing plate member and said tank storage zone means to facilitate positioning of said ejection means therewithin secured to said backing plate member.

6. A mounting bracket with an ejection means for detachable retaining of a cylindrical tank member with respect to a wall surface as defined in claim 5 wherein said ejection means is adapted in the steady state to extend outwardly from said ejection zone means into said tank storage zone means to exert a force against a cylindrical tank member positioned therewithin.

7. A mounting bracket with an ejection means for detachable retaining of a cylindrical tank member with respect to a wall surface as defined in claim 6 wherein said ejection means is entirely contained within said ejection zone means responsive to being moved to the compressed position thereof.

8. A mounting bracket with an ejection means for detachable retaining of a cylindrical tank member with respect to a wall surface as defined in claim 1 wherein said ejection means includes a flat spring means which is flexibly resilient.

9. A mounting bracket with an ejection means for detachable retaining of a cylindrical tank member with respect to a wall surface as defined in claim 8 wherein said ejection means further includes a bumper means secured to said flat spring means for facilitating the exerting of force against a cylindrical tank member positioned within said tank storage zone means while minimizing damaging thereof.

10. A mounting bracket with an ejection means for detachable retaining of a cylindrical tank member with respect to a wall surface as defined in claim 1 wherein said upper clamping member further includes:

A. a first upper extension arm means fixedly secured to said upper clamp base means and extending outward therefrom approximately perpendicularly with respect to said backing plate member, said first upper extension arm means being fixedly secured to said first upper clamp arm means which extends outwardly therefrom to define said tank storage zone means thereadjacent; and B. a second upper extension arm means fixedly secured to said upper clamp base means and extending outward therefrom approximately perpendicularly with respect to said backing plate member, said second upper extension arm means being approximately parallel to and spatially disposed from said first upper extension arm means, said second upper extension arm means being fixedly secured to said second upper clamp arm means which extends outwardly therefrom to facilitate defining of said tank storage zone means thereadjacent, said first upper extension arm means and said second upper extension arm means being large enough to position said tank storage zone means, spatially located between said first upper clamp arm means and said second upper clamp arm means, at a sufficient distance from said backing plate member to facilitate mounting of said ejection means on said backing plate member between said backing plate member and said tank storage zone means.

11. A mounting bracket with an ejection means for detachable retaining of a cylindrical tank member with respect to a wall surface as defined in claim 10 wherein said lower clamping member further includes:

A. a first lower extension arm means fixedly secured to said lower clamp base means and extending outward therefrom approximately perpendicularly with respect to said backing plate member, said first lower extension arm means being fixedly secured to said first lower clamp arm means which extends outwardly therefrom to define said tank storage zone means thereadjacent; and B. a second lower extension arm means fixedly secured to said lower clamp base means and extending outward therefrom approximately perpendicularly with respect to said backing plate member, said second lower extension arm means being approximately parallel to and spatially disposed from said first lower extension arm means, said second lower extension arm means being fixedly secured to said second lower clamp arm means which extends outwardly therefrom to facilitate defining of said tank storage zone means thereadjacent, said first lower extension arm means and said second lower extension arm means being large enough to position said tank storage zone means, spatially located between said first lower clamp arm means and said second lower clamp arm means, at a sufficient distance from said backing plate member to facilitate mounting of said ejection means on said backing plate member between said backing plate member and said tank storage zone means.

12. A mounting bracket with an ejection means for detachable retaining of a cylindrical tank member with respect to a wall surface as defined in claim 11 wherein the distance between said first upper extension arm means and said second upper extension arm means is less than the size of the cylindrical tank member to prevent positioning thereof therebetween and wherein the distance between said first lower extension arm means and said second lower extension arm means is also less than the size of the cylindrical tank member to prevent positioning thereof therebetween.

13. A mounting bracket with an ejection means for detachable retaining of a cylindrical tank member with respect to a wall surface as defined in claim 1 wherein said first upper clamp arm means, said second upper clamp arm means, said first lower clamp arm means and said second lower clamp arm means each include a protective coating applied thereover by dipping which minimizes damaging of a cylindrical tank member retained within said tank storage zone means.

14. A mounting bracket with an ejection means for detachable retaining of a cylindrical tank member with respect to a wall surface as defined in claim 3 wherein said restraining strap means includes:

A. an upper strap section attached with respect to said backing plate member and extending outwardly therefrom, said upper strap section extending around a cylindrical tank member positioned within said tank storage zone means and said being attached with respect to said first clasping means for detachable securement therearound; and B. a lower strap section attached with respect to said backing plate member at a location beneath said upper strap section and extending outwardly therefrom, said lower strap section extending around a cylindrical tank member positioned within said tank storage zone means and said being attached with respect to said first clasping means for detachable securement therearound.

15. A mounting bracket with an ejection means for detachable retaining of a cylindrical tank member with respect to a wall surface as defined in claim 14 wherein said upper strap section is attached to said backing plate member at a position immediately below said upper clamping member and wherein said lower strap section is attached to said backing plate member at a position immediately below said lower clamping member.

16. A mounting bracket with an ejection means for detachable retaining of a cylindrical tank member with respect to a wall surface as defined in claim 1 wherein said ejection means is secured to said backing plate member at a position below said upper clamping member and above said lower clamping member to facilitate operative ejection of a cylindrical tank member responsive to disengagement of said restraining means.

17. A mounting bracket with an ejection means for detachable retaining of a cylindrical tank member with respect to a wall surface as defined in claim 10 wherein said first upper clamp arm means, said first upper extension arm means, said upper clamp base means, said second upper extension arm means and said second upper clamp arm means are formed integrally.

18. A mounting bracket with an ejection means for detachable retaining of a cylindrical tank member with respect to a wall surface as defined in claim 11 wherein said first lower clamp arm means, said first lower extension arm means, said lower clamp base means, said second lower extension arm means and said second lower clamp arm means are formed integrally.

19. A mounting bracket with an ejection means for detachable retaining of a cylindrical tank member with respect to a wall surface comprising:

A. a backing plate member securable to a wall surface and defining an ejection zone means immediately thereadjacent;

B. an upper clamping member extending outwardly away from said backing plate member and defining a tank storage zone means adjacent said ejection zone means for selectively receiving and holding of a cylindrical tank member therewithin, said ejection zone means being positioned between said tank storage zone means and said backing plate member, said upper clamping member including:

(1) an upper clamp base means secured to said backing plate member to facilitate securement of said upper clamping member fixedly with respect to said backing plate member;

(2) a first upper clamp arm means secured to and extending outwardly from said upper clamp base means to engage the cylindrical tank member for facilitating retaining thereof selectively in said tank storage zone means in abutment with respect to said first upper clamp arm means, said first upper clamp arm means including a first upper clamp arm protective coating applied thereover by dipping which minimizes damaging of a cylindrical tank member retained within said tank storage zone means thereadjacent;

(3) a second upper clamp arm means secured to and extending outwardly from said upper clamp base means at a position spatially disposed oppositely from said first upper clamp arm means, said first upper clamp arm means and said second upper clamp arm means defining said tank storage zone means therebetween, said second upper clamp arm means adapted to abut the cylindrical tank member oppositely from said first upper clamp arm means responsive to the cylindrical tank member being positioned in said tank storage zone means to facilitate selective retaining thereof with respect to said backing plate member, said second upper clamp arm means including a second upper clamp arm protective coating applied thereover by dipping which minimizes damaging of a cylindrical tank member retained within said tank storage zone means thereadjacent;

(4) a first upper extension arm means fixedly secured to said upper clamp base means and extending outward therefrom approximately perpendicularly with respect to said backing plate member, said first upper extension arm means being fixedly secured to said first upper clamp arm means which extends outwardly therefrom to define said tank storage zone means thereadjacent;

(5) a second upper extension arm means fixedly secured to said upper clamp base means and extending outward therefrom approximately perpendicularly with respect to said backing plate member, said second upper extension arm means being approximately parallel to and spatially disposed from said first upper extension arm means, said second upper extension arm means being fixedly secured to said second upper clamp arm means which extends outwardly therefrom to facilitate defining of said tank storage zone means thereadjacent, said first upper extension arm means and said second upper extension arm means being large enough to position said tank storage zone means, spatially located between said first upper clamp arm means and said second upper clamp arm means, at a sufficient distance from said backing plate member to facilitate mounting of said ejection means on said backing plate member between said backing plate member and said tank storage zone means, said second upper extension arm means being spatially disposed from said first upper extension arm means at a distance less than the size of the cylindrical tank member to prevent positioning thereof therebetween;

C. a lower clamping member extending outwardly away from said backing plate member at a position below said upper clamping member and further defining the tank storage zone means adjacent said ejection zone means for selectively receiving and holding of a cylindrical tank member therewithin, said ejection zone means being positioned between said tank storage zone means and said backing plate member, said lower clamping member including:

(1) a lower clamp base means secured to said backing plate member to facilitate securement of said lower clamping member fixedly with respect to said backing plate member;

(2) a first lower clamp arm means secured to and extending outwardly from said lower clamp base means to engage the cylindrical tank member for facilitating retaining thereof selectively in said tank storage zone means in abutment with respect to said first lower clamp arm means, said first lower clamp arm means including a first lower clamp arm protective coating applied thereover by dipping which minimizes damaging of a cylindrical tank member retained within said tank storage zone means thereadjacent;

(3) a second lower clamp arm means secured to and extending outwardly from said lower clamp base means at a position spatially disposed oppositely from said first lower clamp arm means, said first lower clamp arm means and said second lower clamp arm means further defining said tank storage zone means therebetween, said second lower clamp arm means adapted to abut the cylindrical tank member oppositely from said first lower clamp arm means responsive to the cylindrical tank member being positioned in said tank storage zone means to facilitate selective retaining thereof with respect to said backing plate member, said second lower clamp arm means including a second lower clamp arm protective coating applied thereover by dipping which minimizes damaging of a cylindrical tank member retained within said tank storage zone means thereadjacent;

(4) a first lower extension arm means fixedly secured to said lower clamp base means and extending outward therefrom approximately perpendicularly with respect to said backing plate member, said first lower extension arm means being fixedly secured to said first lower clamp arm means which extends outwardly therefrom to define said tank storage zone means thereadjacent;

(5) a second lower extension arm means fixedly secured to said lower clamp base means and extending outward therefrom approximately perpendicularly with respect to said backing plate member, said second lower extension arm means being approximately parallel to and spatially disposed from said first lower extension arm means, said second lower extension arm means being fixedly secured to said second lower clamp arm means which extends outwardly therefrom to facilitate defining of said tank storage zone means thereadjacent, said first lower extension arm means and said second lower extension arm means being large enough to position said tank storage zone means, spatially located between said first lower clamp arm means and said second lower clamp arm means, at a sufficient distance from said backing plate member to facilitate mounting of said ejection means on said backing plate member between said backing plate member and said tank storage zone means, said second lower extension arm means being spatially disposed from said first lower extension arm means at a distance less than the size of the cylindrical tank member to prevent positioning thereof therebetween;

D. an ejection means secured to said backing plate member within said ejection zone means and adapted in steady state to exert a force continuously against a cylindrical tank member positioned within said tank storage zone means for urging ejecting movement thereof outwardly therefrom, said ejection means being capable of being forced to move to a compressed position completely positioned within said ejection zone means to allow the cylindrical tank member to be retained in said tank storage zone means, said ejection means being secured to said backing plate member at a position below said upper clamping member and above said lower clamping member to facilitate operative ejection of a cylindrical tank member unless said restraining means is engaged, said ejection means including:

(1) a flat spring means which is flexibly resilient and attached to said backing plate member;

(2) a bumper means secured to said flat spring means for facilitating the exerting of force against a cylindrical tank member positioned within said tank storage zone means while minimizing damaging thereof;

E. a restraining means comprising a restraining strap means which is flexible and is attached with respect to said backing plate member and adapted to extend around the cylindrical tank member for selective retaining thereof within said tank storage zone means and for retaining of said ejection means in the compressed position in abutment with respect to the cylindrical tank member responsive to retaining of the cylindrical tank member in said tank storage zone means, said restraining means further including:

(1) a first clasping means attached with respect to said backing plate member and extending outwardly therefrom;

(2) a second clasping means attached with respect to said restraining strap means and detachably engageable with respect to said first clasping means to detachably secure said restraining strap means in position extending around a cylindrical tank member positioned in said tank storage zone means with said ejection means held in the compressed position, said first clasping means being fixedly secured rigidly with respect to said backing plate member to facilitate selective detachment and detachable securement of said second clasping means with respect to said first clasping means by a user while simultaneously allowing holding of the cylindrical tank member within said tank storage zone means by the user;

(3) an upper strap section attached with respect to said backing plate member and extending outwardly therefrom, said upper strap section extending around a cylindrical tank member positioned within said tank storage zone means and being attached with respect to said first clasping means for detachable securement therearound, said upper strap section being attached to said backing plate member at a position immediately below said upper clamping member;

(4) an lower strap section attached with respect to said backing plate member at a location beneath said upper strap section and extending outwardly therefrom, said lower strap section extending around a cylindrical tank member positioned within said tank storage zone means and being attached with respect to said first clasping means for detachable securement therearound, said lower strap section being attached to said backing plate member at a position immediately below said lower clamping member; and F. a lower shelf member secured to said backing plate member and extending outwardly therefrom to provide lower support for a cylindrical tank member positioned in said tank storage zone means, said lower shelf member extending outwardly from said backing plate member at an angle with respect thereto of greater than ninety degrees to facilitate passive ejection of a cylindrical tank member from said tank storage zone means unless retained therewithin by said restraining means.

20. A mounting bracket with an ejection means for detachable retaining of a cylindrical tank member with respect to a wall surface comprising:

A. a backing plate member securable to a wall surface;

B. an upper clamping member extending outwardly away from said backing plate member and defining a tank storage zone means for selectively receiving and holding of a cylindrical tank member therewithin, said upper clamping member including:

(1) an upper clamp base means secured to said backing plate member to facilitate securement of said upper clamping member fixedly with respect to said backing plate member;

(2) a first upper clamp arm means secured to and extending outwardly from said upper clamp base means to engage the cylindrical tank member for facilitating retaining thereof selectively in said tank storage zone means in abutment with respect to said first upper clamp arm means;

(3) a second upper clamp arm means secured to and extending outwardly from said upper clamp base means at a position spatially disposed oppositely from said first upper clamp arm means, said first upper clamp arm means and said second upper clamp arm means defining said tank storage zone means therebetween, said second upper clamp arm means adapted to abut the cylindrical tank member oppositely from said first upper clamp arm means responsive to the cylindrical tank member being positioned in said tank storage zone means to facilitate selective retaining thereof with respect to said backing plate member;

C. a lower clamping member extending outwardly away from said backing plate member at a position below said upper clamping member and further defining the tank storage zone means for selectively receiving and holding of a cylindrical tank member therewithin, said lower clamping member including:

(1) an lower clamp base means secured to said backing plate member to facilitate securement of said lower clamping member fixedly with respect to said backing plate member;

(2) a first lower clamp arm means secured to and extending outwardly from said lower clamp base means to engage the cylindrical tank member for facilitating retaining thereof selectively in said tank storage zone means in abutment with respect to said first lower clamp arm means;

(3) a second lower clamp arm means secured to and extending outwardly from said lower clamp base means at a position spatially disposed oppositely from said first lower clamp arm means, said first lower clamp arm means and said second lower clamp arm means further defining said tank storage zone means therebetween, said second lower clamp arm means adapted to abut the cylindrical tank member oppositely from said first lower clamp arm means responsive to the cylindrical tank member being positioned in said tank storage zone means to facilitate selective retaining thereof with respect to said backing plate member;

D. an ejection means secured to said backing plate member and adapted in steady state to exert a force continuously on a cylindrical tank member positioned within said tank storage zone means for urging ejecting movement thereof outwardly therefrom, said ejection means including a lower shelf member secured to said backing plate member and extending outwardly therefrom to provide lower support for a cylindrical tank member positioned in said tank storage zone means, said lower shelf member oriented extending outwardly from said backing plate member at an angle of greater than ninety degrees with respect thereto to facilitate passive ejection of a cylindrical tank member from said tank storage zone means unless restrained therewithin; and E. a restraining means attached with respect to said backing plate member and adapted to engage the cylindrical tank member for selective retaining thereof within said tank storage zone means.

21. A mounting bracket with an ejection means for detachable retaining of a cylindrical tank member with respect to a wall surface as defined in claim 20 wherein said ejection means further includes a means to exert a force laterally and continuously against a cylindrical tank member positioned within said tank storage zone means for urging ejecting movement thereof outwardly therefrom which is urged to move to a compressed position responsive to retaining of the cylindrical tank member in said tank storage zone means.

22. A mounting bracket with an ejection means for detachable retaining of a cylindrical tank member with respect to a wall surface as defined in claim 21 wherein said restraining means is adapted to retain said ejection means in the compressed position in abutment with respect to the cylindrical tank member responsive to retaining of the cylindrical tank member in said tank storage zone means.

23. A mounting bracket with an ejection means for detachable retaining of a cylindrical tank member with respect to a wall surface as defined in claim 21 wherein said means to exert a force laterally and continuously against a cylindrical tank member includes a flat spring means which is flexibly resilient.

* * * * *